United States Patent [19]
Ho et al.
[11] 3,859,633
[45] Jan. 7, 1975

[54] MINUTIAE RECOGNITION SYSTEM

[75] Inventors: Allen P. Ho, Poughkeepsie; Yee-Ming Ting, Fishkill, both of N.Y.
[73] Assignee: International Business Machines Corporation, Armonk, N.Y.

[22] Filed: June 29, 1973
[21] Appl. No.: 375,191

[52] U.S. Cl. ................ 340/146.3 E, 340/146.3 MA
[51] Int. Cl. ............................................ G06k 9/00
[58] Field of Search........... 340/146.3 E, 146.3 MA, 340/146.3 AC, 146.3 R, 146.3 H; 356/71

[56] References Cited

UNITED STATES PATENTS

| | | | |
|---|---|---|---|
| 2,952,181 | 9/1960 | Maurer | 340/146.3 E |
| 3,088,096 | 4/1963 | Steinbuch | 340/146.3 Y |
| 3,248,552 | 4/1966 | Bryan | 250/219 |
| 3,511,571 | 5/1970 | Ogle | 356/71 |
| 3,537,070 | 10/1970 | Malek | 340/146.3 E |
| 3,558,864 | 1/1971 | French | 235/150 |
| 3,582,889 | 6/1971 | Bodez | 340/146.3 E |
| 3,588,818 | 6/1971 | Congleton et al. | 340/146.3 MA |
| 3,611,290 | 10/1971 | Luisi et al. | 340/146.3 E |
| 3,613,080 | 10/1971 | Angeloni et al. | 340/146.3 E |
| 3,699,519 | 4/1971 | Campbell | 340/146.3 E |

OTHER PUBLICATIONS

Banner, "The State of Development of the FBI's Automatic Fingerprint ID System," FBI Law Enforcement Bull., June, 1973. pp. 9–13.

Stock, "Automatic Fingerprint Reading," Proc.-1972 Carnahan Conference on El. Crime Countermeasures, Apr., 1972, pp. 16–28.

Wegstein, "Automated Fingerprint ID," N.B.S. Tech. Note No. 538, Aug. 1970, pp. 1–31.

*Primary Examiner*—Gareth D. Shaw
*Assistant Examiner*—Leo H. Boudreau
*Attorney, Agent, or Firm*—Thomas F. Galvin

[57] ABSTRACT

A system for detecting bifurcations and ridge endings (minutiae) in a fingerprint or on similar patterns in which two lines merge into one. The print is optically scanned, converted into electrical signals and entered into a novel continuity logic network. The presence of a bifurcation in the network results in three distinct outputs on the periphery of the network from at least two sides. The split in the bifurcation may also be detected by reversing the polarity of the electrical signals and detecting a single output. Means are also provided for ensuring that a single bifurcation is detected only once. Ridge endings are treated as reverse-polarity bifurcations and can be detected by the same system elements.

17 Claims, 13 Drawing Figures

MINUTIAE RECOGNITION SYSTEM

CROSS REFERENCE TO A RELATED APPLICATION

This application is related to the application of A. P. Ho and H. T. Lee, Ser. No. 375,211, filed June 29, 1973 and assigned to the same assignee as the present application.

BACKGROUND OF THE INVENTION

1. Field of the Invention

This invention relates to the detection of the merger of lines in a pattern of lines and spaces. More particularly, the invention relates to the detection of minutiae in a fingerprint.

2. Description of the Prior Art

The importance of accurate and automated fingerprint identification and verfication requires no extended discussion. Law enforcement agencies such as the Federal Bureau of Investigation have been encouraging and soliciting the electronic industry to develop an automatic fingerprint identification processor. The broad details of such a processing system are well known and many facets of such a system are well within today's technology. The most widely accepted system comprises optically scanning a fingerprint or a transparency thereof, converting it into electrical signals, detecting and storing the unique characteristics of the given fingerprint whereby it may be compared to information already in storage and the results of the comparison retrieved from storage for identification or verification purposes.

Within the last few years many researchers in this field have settled on the detection and location of ridge endings and bifurcations in the fingerprint as the most likely way to succeed. It has been demonstrated that these so-called minutiae afford positive identification. In practice, minutiae recognition is quite difficult. The primary difficulty is that the quality of the fingerprints varies greatly in contrast and clarity. In addition, the width of the ridges and the valleys, i.e., the distance between ridge centers, varies widely. Various proposals to solve this problem have been suggested and many have been implemented with varying degrees of success. Many of these sytems appear in the patent literature and are familiar to those of skill in the art. Hence extended discussion is deemed unnecessary. Suffice it to say that to our knowledge none of the prior art systems have been used successfully in field operations of law enforcement agencies or by others who would use such a system, as for example, issuers of credit cards.

SUMMARY OF THE INVENTION

It is therefore an object of the present invention to improve the recognition of minutiae in patterns such as fingerprints.

It is another object of this invention to do so efficiently, using electronic equipment and circuits which are commercially available.

It is yet another object of our invention to provide circuits for accurately determining the presence of minutiae in a fingerprint.

These and other objects and advantages are provided by impressing digital electrical representations of areas of the fingerprint on a first continuity logic network for recognizing bifurcations and ridge endings. For a bifurcation, the network generates three positive output signals. Ridge endings may be detected by inverting the input signals from the print. This reversal causes the network to also generate a positive output signal for a ridge ending.

In the preferred embodiment of the invention, a second continuity logic network is provided which has impressed thereon the reversal of the electrical signals to detect the split in the bifurcation or the area around the ridge endings.

Novel decision circuits are provided for determining the existence of bifurcations, splits, ridge endings and the area around the ridge endings.

Means are also provided to inhibit the recognition of the same minutia twice.

The present system is applicable generally to the identification of any pattern which consists of contrasting lines and spaces and where two lines merge into one. For example, the testing and classification of conductive lines on printed circuits could also be accomplished with the present invention. The conductive lines are highly reflective in comparison with the substrate on which the lines are deposited.

DESCRIPTION OF THE PREFERRED EMBODIMENT

The following description is with respect to the detection of bifurcations and splits in bifurcations only. A bifurcation is the merger of two ridges into a single ridge. A ridge ending is the termination of a ridge in the fingerprint and appears as a negative of a bifurcation. Therefore, the present system can be used to detect ridge endings merely by inverting the polarity of the video signals. Therefore, a detailed discussion of the system with respect to bifurcations and splits is all that is necessary to encompass minutiae detection in general.

Figure 1:
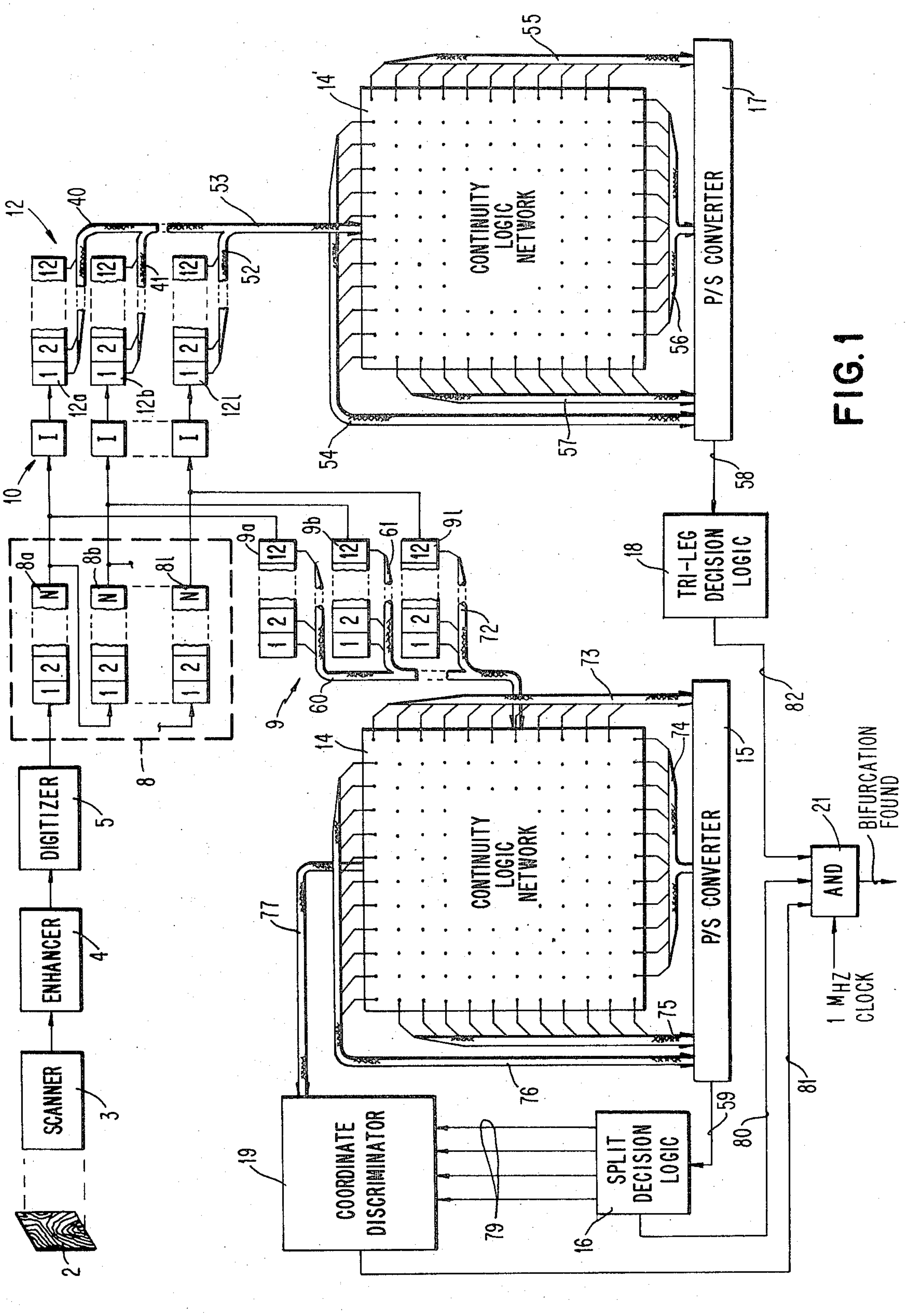
FIG. 1 is a block diagram of the preferred embodiment of a bifurcation recognition system.

With reference to the overall system illustrated in FIG. 1, a fingerprint 2, which is suitably illuminated, is scanned by scanner 3 which generates video signals representative of the ridges and spaces within fingerprint 2. The analog signals are transmitted to enhancer 4 before being converted to binary signals by digitizer 5.

The elements just described have been used in various fingerprint systems and comprise no part of the present invention. Fingerprint 2 may be an actual print impressed on a prism or may be a transparency of a print suitably illuminated so that it can be scanned by scanner 3 which typically would be a flying spot scanner, a TV camera or vidicon, all of which are commercially available to generate a video signal. Enhancer 4 acts as a ridge-valley filter to accentuate the difference in contrast between the ridges of the print and the valleys between the ridges. Various types of enhancement techniques could be used for taking into account the gradual gradations in lighting over the surface of the fingerprint. One such circuit is described by W. K. Rackl in a publication entitled "Dynamic Threshold Circuit", IBM Technical Disclosure Bulletin, Volume 15, No. 4, September 1972, pp. 1138–1139. Other enhancement techniques for filling in small breaks in ridges, separating blurred valleys and editing blank or heavily smeared areas have also been developed. These techniques may be applied to the transparency of the print itself prior to entry into the recognition system or in an on-line device as illustrated.

The analog signal indicative of the pattern at a selected position on the print is quantized into binary signals by digitizer 5. Digitizer 5 is preferably an Analog-Digital Converter of standard design capable of sampling the video signal at a 1 MHz rate resulting in a matrix of 350 × 262 points representative of print 2. The binary signals are then transmitted to temporary memory 8 which comprises a plurality of digital shift registers 8A, 8B, ... 8L accessed in parallel. In the present embodiment each shift register has N = 350 individual locations and there are 12 such shift registers, thereby providing temporary storage for 4200 bits of information at any given instant, or 12 video lines.

After the 4200 bits of information have been stored in temporary storage 8 they are transmitted seriatim to a set of 12-bit shift registers 9 and through inverters 10 to a corresponding set of 12-bit shift registers 12.

Each set of shift registers 9 and 12 comprise twelve individual shift registers, thereby providing simultaneous indications of 144 bits of information to continuity logic networks 14 and 14', respectively.

Networks 14 and 14' will be described in greater detail in later sections of this specification. In general, they serve as storage means for the binary representations of a particular section of fingerprint 2 which has been scanned and digitized. It is from this binary representation that the detection of a bifurcation in electrical form is accomplished.

The periphery of networks 14 and 14' have output lines connected to the inputs of parallel-to-serial converters 15 and 17, respectively. Thus, the periphery of network 14 which in a 12 × 12 matrix comprises 44 circuits, are connected to converter 15 through cables 73, 74, 75 and 76 as indicated in FIG. 1. Similarly, the 44 peripheral circuits of matrix 14' are connected to the inputs of converter 17 through cables 54, 55, 56 and 57. Converters 15 and 17 are clocked at 44 MHz to synchronize their operation with the rest of the system.

Network 14' indicates whether there are three legs of a bifurcation present. The peripheral outputs stored in converter 17 are transmitted to a TRI-LEG decision logic circuit 18 which determines the existence of three legs. A positive output from logic circuit 18 via connection 82 is transmitted to AND circuit 21.

Network 14 serves to identify the split in the bifurcation noted in network 14'. SPLIT decision logic circuit 16 generates a positive output on connection 80 to AND circuit 21 if a split is found.

Certain of the circuits at the center of network 14 have outputs on cable 77 to COORDINATE DISCRIMINATOR 19. In addition, outputs 79 from logic circuit 16 have inputs to discriminator 19. As will be more fully described in a later section of this specification, discriminator 19 serves to block the recognition of the same bifurcation more than once. The output from discriminator 19 is also transmitted to AND circuit 21 through connection 81. The coincidence of outputs from logic circuits 18, 16 and 19 at AND gate 21 generate an output indicative of a bifurcation.

When the criteria of a bifurcation are satisfied, the coordinates of this point on the fingerprint are stored in a suitable memory (not shown). In addition, the point may be superimposed on a bright spot on the print as viewed from a TV monitor.

Figure 2:
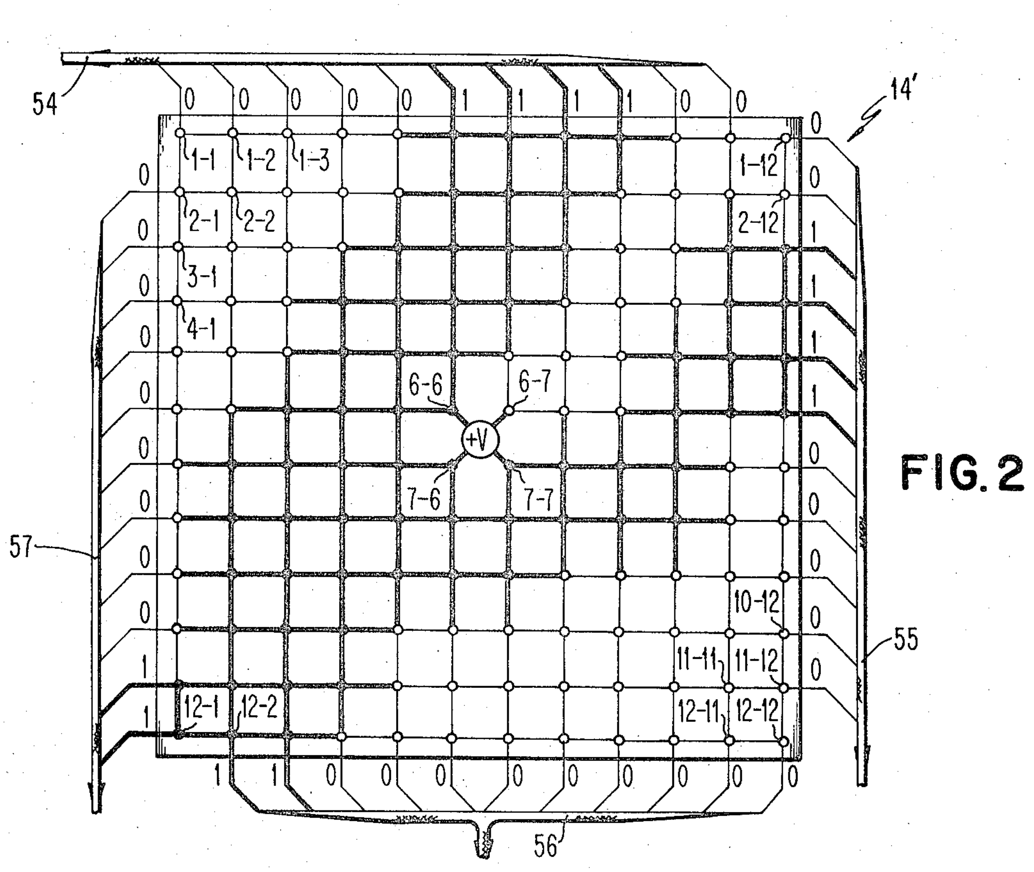
FIGS. 2 and 3 are illustrations of the continuity logic network 14 and 14' each respectively having electrical representations of a bifurcation and of a split impressed thereon.

FIG. 2 illustrates the presence of an exemplary bifurcation which is impressed on continuity logic network 14'. Network 14' comprises a source of potential, +V, at the center of a 12× 12 matrix. The +V source functions as a continuity signal. Each matrix point is a logic circuit which functions to generate an output upon the coincidence of a signal from its corresponding storage location in shift register 12 and a signal from one of the four matrix points located adjacent and orthogonal to it. For example, an input to circuit 5-4 of network 14' from its associated position in the shift register array 12 plug an input received from either one of circuits 5-3, 5-5, 4-4, or 6-4 causes circuit 5-4 to generate an output. In similar fashion, peripheral circuit 1-2 is associated with three circuits: 1-1, 1-3 and 2-2. An output signal from one such circuit is transmitted to the inputs of the adjacent, orthogonal matrix points. Thus, there is a two-way path between a circuit at any given matrix point and its adjacent, orthogonal circuits, whereby any such circuit can energize or become energized by the adjacent, orthogonal circuits in conjunction with signals received from shift registers 12.

As illustrated by the heavy shaded lines in FIG. 2, a bifurcation is represented by three distinct sets of grouped output signals from the +V source to the periphery of the matrix. A continuous output from +V to one of the peripheral output lines is indicated by a logical '1' in FIG. 2; and an output which is not connected to the +V source is indicated by a logical '0'. Only a single such conductive path from +V to the periphery is necessary to constitute a leg of a bifurcation. The logical 0 signals on the periphery serve to separate the individual legs of the bifurcation. For a continuity path to be established, it is necessary that at least one of four elements 6-6, 6-7, 7-6 or 7-7 receive a signal from shift register 12.

Figure 3:
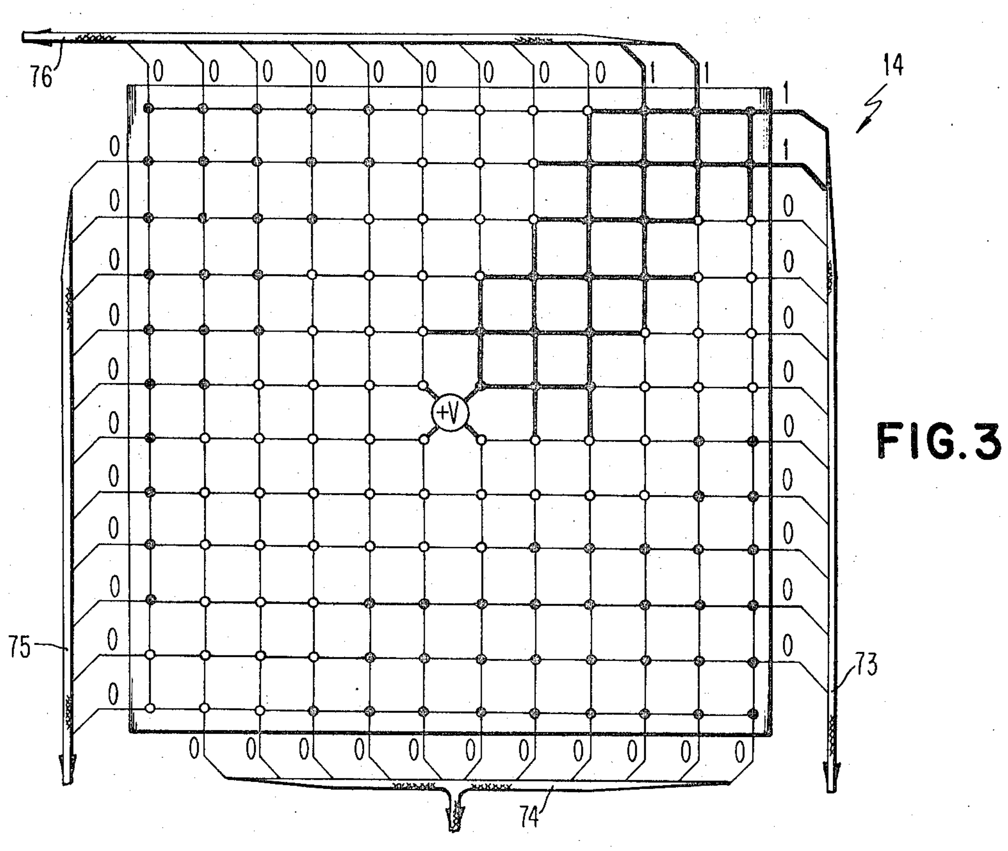

FIG. 3 illustrates an exemplary illustration of the split in the bifurcation illustrated in FIG. 2. As previously noted with respect to FIG. 1 the binary signals from the print are transmitted to network 14 in their 'true' (logical 1) form whereas the signals transmitted to network 14' are inverted (logical 0). The legs of a bifurcation on a fingerprint appear as blank or white video dots and the split appears as a black video dot, the latter being represented by a logical 1 in the system.

As shown in heavy lines in FIG. 3, the split in the bifurcation is represented by a single set of grouped output potentials from +V to the periphery of the matrix. As with the bifurcations in FIG. 2, it is necessary that continuity exist from the center of the matrix having the potential of +V to the periphery without any open connections for the split to be detected. Thus, there are other points in the matrix which receive signals from their corresponding storage locations in shift registers 9 such as point 1-1; but no output will be generated at the periphery of the matrix because there is no continuous conductive path from the potential source +V to that point.

The recognition of both the bifurcation as well as the split in the bifurcation is necessary due to the noise level caused by the video portion of the system. Without the noise problem only matrix 14′ would be necessary.

An alternate technique for determining the existence of the three legs and the split in the bifurcation is to use an alternate-polarity system. In such a system, a polarity control gate would be inserted between temporary memory 8 and shift registers 9. Network 14′ shift registers 12 and inverters 10 would be eliminated. However, this type of system requires that the polarity of the video signal change with each video line, increasing the complexity of the system.

Figure 4:
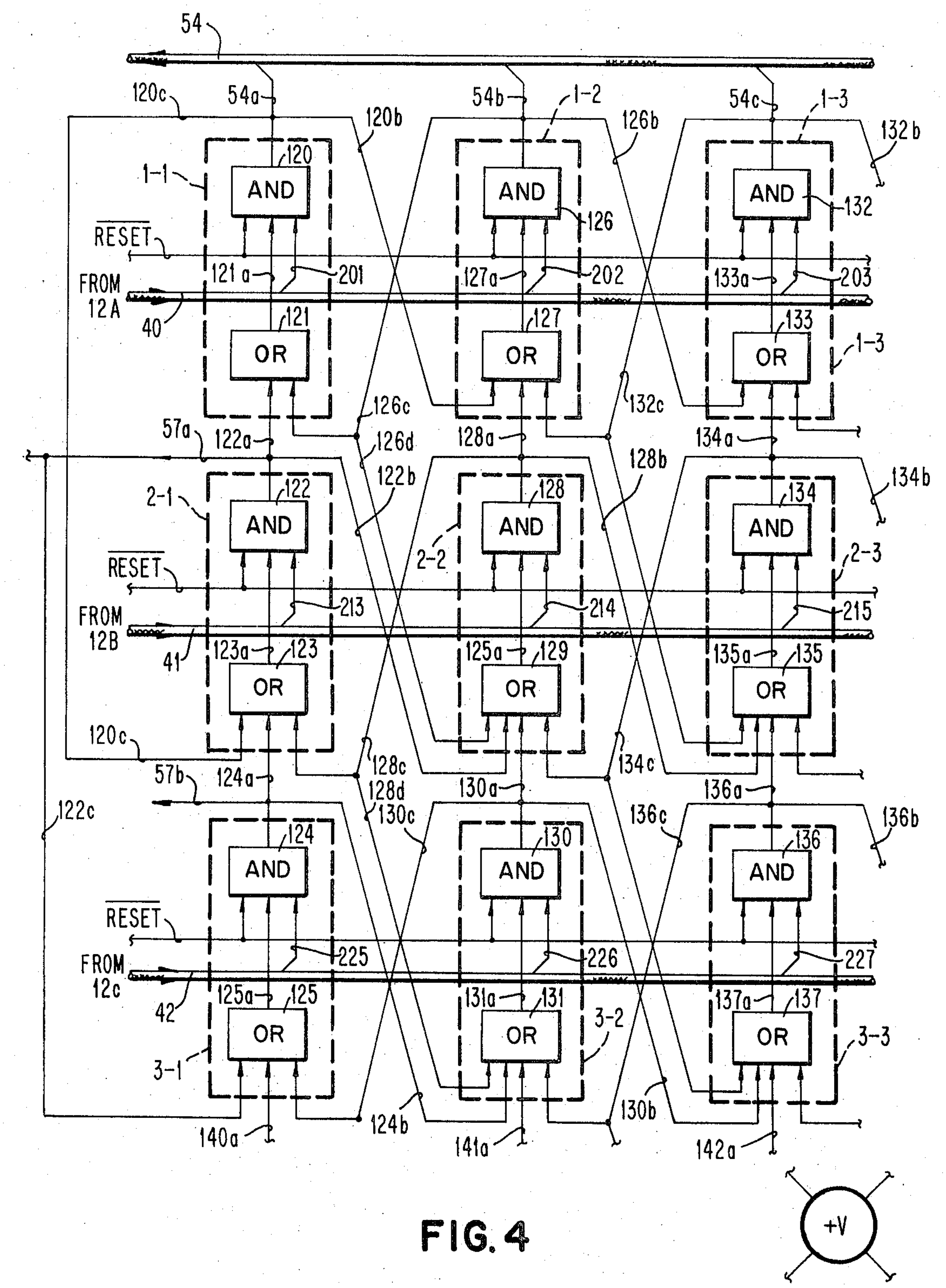
FIG. 4 is an electrical circuit diagram illustrating the detailed construction of individual points in networks 14 and 14'.

Turning now to FIG. 4 there is shown a submatrix of logic gates which comprise the matrix of logic networks 14 and 14′. Each circuit enclosed by dotted lines corresponds to one element in the matrix. Referring to circuit 1-1 as being exemplary of the 144 circuits in a 12 × 12 matrix, it comprises AND gate 120 having a pair of inputs 201 and 121*a* plus a $\overline{\text{reset}}$ input. Wire 201 emanates from storage location 1 in shift register 9A of the shift register array 9. Input connection 121*a* is the output from OR gate 121. The $\overline{\text{reset}}$ line is ordinarily at a logical 1 level during the gating time and is actuated in conjunction with all other $\overline{\text{reset}}$ lines so as to clear the matrix between cycles. The inputs to OR gate 129 are received from the outputs of the AND gates of the circuits which are adjacent and orthogonally located with respect to circuit 2-2, i.e., 1-2, 2-1, 3-2 and 2-3. In similar fashion the single output from AND gate 128 is connected to the inputs of each of the four adjacent and orthogonally placed logic circuits. Thus, in general, each circuit in continuity logic network 14 and 14′ both: (1) addresses and (2) is addressed by the four circuits associated with it.

An understanding of the operation of the circuit in FIG. 4 results in a better understanding of the operation of networks 14 and 14′. Assume that logical 1 signals are stored in the locations of shift register 12 associated with circuits 1-2, 2-2, 2-3 and 3-3. Logical 0 signals are stored at the shift register locations associated with the remaining circuits 1-1, 1-3, 2-1, 3-1 and 3-2 in the submatrix. If other circuits in the matrix are energized such that the potential source +V is propagated to line 142*a*, then a logical 1 (+V) will be generated on line 54*b* at the periphery of the matrix. Because line 142*a* is at a 1 level, the output line 137*a* of OR gate 137 is also at a 1 level. Input 227 is at a 1 level as previously indicated; AND gate 136 generates a logical 1 output. A logical 1 output from gate 136 is fed via lines 136*a* and 136*c* to the inputs of circuits 2-3 and 3-2, respectively. However, only circuit 2-3 can generate an output because the AND gate 130 is rendered inactive due to the logical 0 signals on lines 226. The logical 1 signal on line 136*a* is gated through OR circuit 135 on line 135a to generate a logical 1 in conjunction with the logical 1 on input 215 from AND gate 134.

Circuit 2-2 is gated in similar fashion so that the signal on line 128*a* is a logical 1. This signal then gates circuit 1-2 to generate an output at peripheral connection 54*b*. No outputs are generated on the other peripheral lines.

Figure 5:
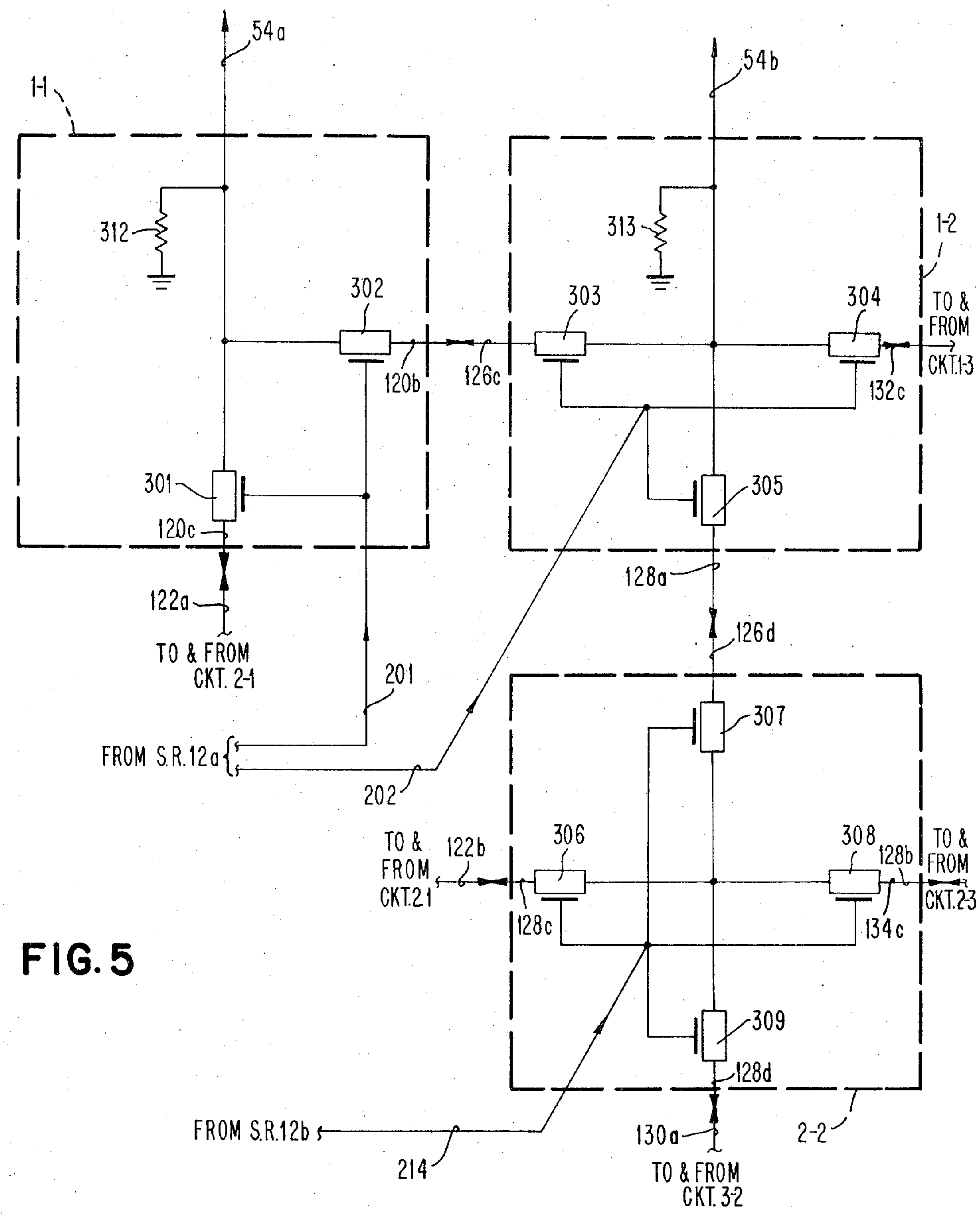
FIG. 5 is an illustration of the circuit diagram in FIG. 4 comprising field effect transistors.

FIG. 5 illustrates the circuits which comprise the continuity logic network fabricated in the form of field effect transistors. Field effect transistors are chosen as the preferred embodiment of these matrix circuit elements because of their relatively small cost, ease of fabrication in integrated circuit form and noise immunity. It will be clear to those of skill in this art that other types of circuits could be used to perform the same function. For example, bipolar transistors configured as TTL circuits or current switch emitter follower circuits can perform the same functions. At the present state of the art the configuration of these circuits into AND and OR gates are quite well known and no further description is required.

For brevity and ease of illustration, only circuits 1-1, 1-2 and 2-2 are illustrated in FIG. 5. All of the remaining circuits in the matrix would be constructed in the same fashion as one of these circuits and further illustration would be redundant.

Upon examination of FIG. 5, it will be readily apparent that the field effect transistors in each circuit element have a common input line at their gate electrodes. For purposes of the present system, the field effect transistors are enhancement mode N channel devices and the standard terminology of gate, source and drain is used for descriptive purposes. As is well known to those of skill in the art, the difference between the source and drain of modern field effect transistors does not lie in the structure of the transistor itself but merely in the manner of biasing. In N channel device terminology the source is generally connected to the positive bias and the drain is generally connected to a lower potential.

The correlation between the field effect transistor circuit in FIG. 5 and the logic circuit of FIG. 4 can be appreciated by referring specifically, for example, to circuit 2-2, as this represents the most complicated circuit in the matrix of logic circuits which comprise the continuity logic network.

The numbered inputs to OR gate 129 in FIG. 4 correspond to the identically numbered inputs to the source regions of transistors 306, 307, 308 and 309. The numbered outputs from AND gate 128 in FIG. 4 also correspond to the identically numbered outputs from the source regions. Thus the source regions form a two way link between associated circuits.

There is one field effect transistor for each circuit which is associated with the circuit under consideration. Thus, circuit 2-2, which has four circuits located adjacent and orthogonally with respect to it, contains four field effect transistors; whereas circuits 1-2 and 1-1 contain three and two field effect transistors respectively because of their positions at the periphery of the matrix. The outputs at the periphery are taken from the common drain connections at circuits 1-1 and 1-2 through load resistors 312 and 313, respectively, which have values of around 500 ohms. The resistors function to prevent the drain nodes from floating. In the operation of circuit 2-2, a positive signal from shift register **12*b* on line 214 gates FET's 306-309. A positive continuity signal +V from one of the associated circuits 2-1, 1-2, 2-3 or 3-2 is then gated through the source of the associated FET 306, 307, 308 or 309, respectively. This signal is then available at the other FET sources to energize other circuits associated with circuit 2-2. If a signal is received by circuit 1-2 on line 202, the continuity signal from the +V continuity source appears at line 54b to be detected by logic circuit 18.**

The FET configuration in FIG. 5 requires amplifier circuits at selected locations in the matrix to boost the signal level. However, their inclusion is a matter of design choice and is omitted for ease of illustration.

Figure 6:
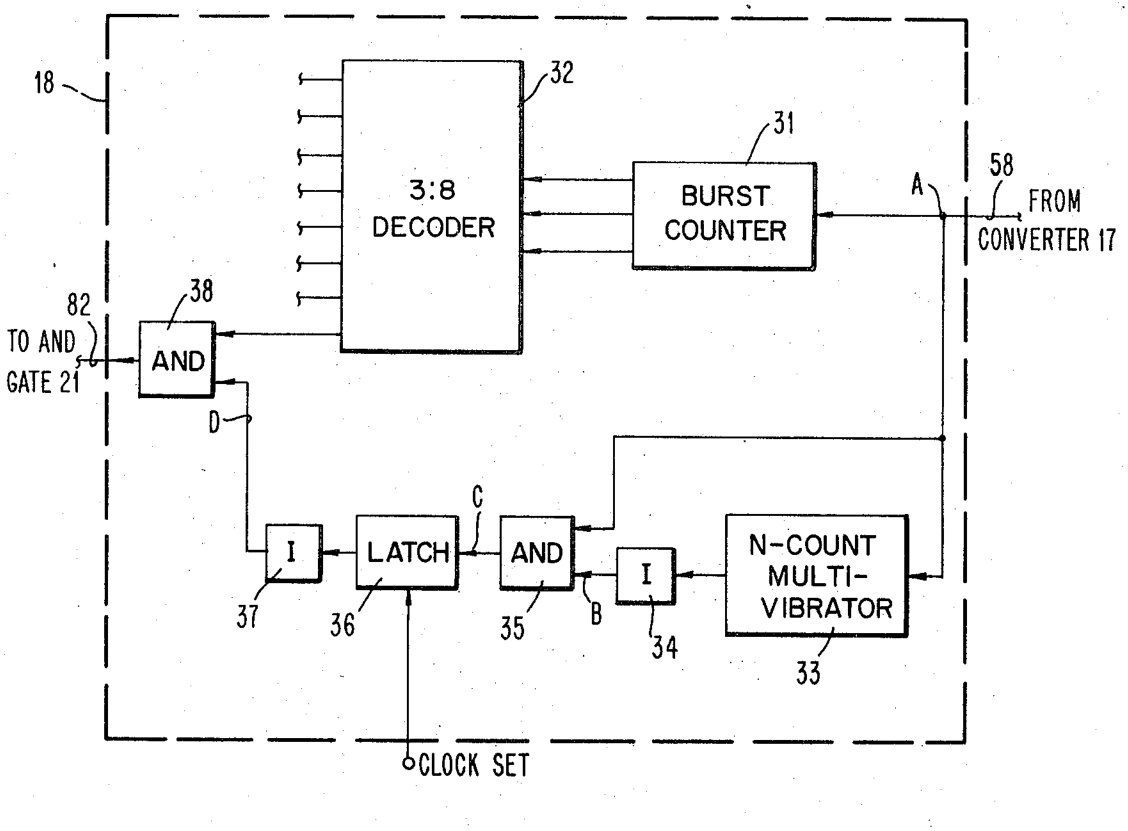
FIG. 6 is a detailed diagram of tri-leg decision logic circuit 18.
Figure 7:
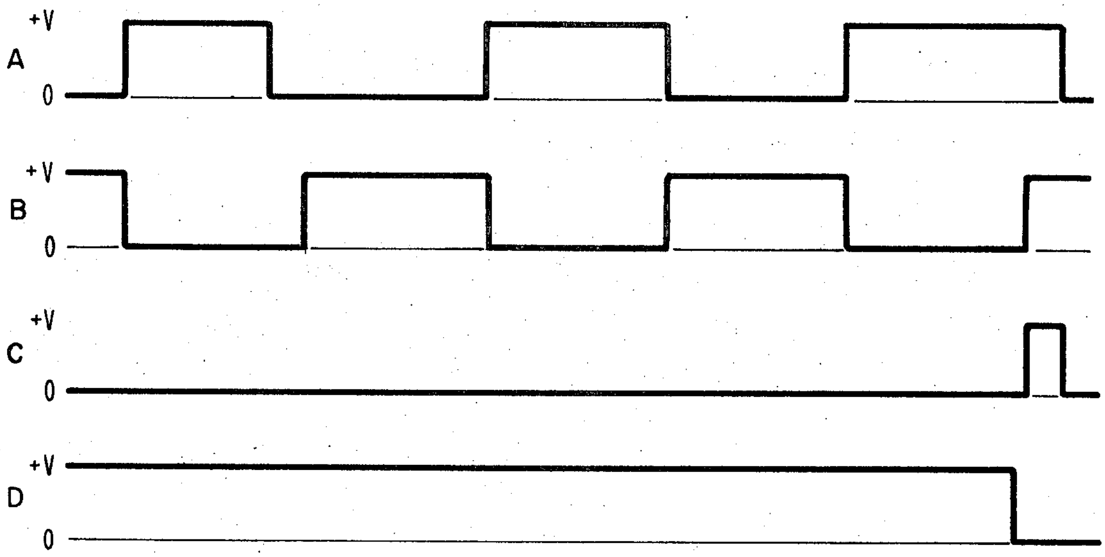
FIG. 7 is a timing diagram illustrating the timing relationship of pertinent signals within logic block 18.

Turning now to FIGS. 6 and 7, TRI-LEG decision logic circuit 18 is shown in more detail in conjunction with a timing diagram of waveforms generated within the circuit responsive to the outputs from continuity logic network 14'. As previously discussed, a bifurcation superimposed on network 14' generates a set of three distinct groups of logical 1 output signals. Each such group is separated by at least one logical 0 signal.

Circuit 18 performs two functions. Primarily it functions as a means for generating an output at line 82 indicative of the identification of three and only three distinct groups of signals indicative of a bifurcation. In addition, circuit 18 operates to reject any set of three groups in which any single group of signals contains more than a predetermined number of logical 1 signals. This latter function is a noise check to eliminate the results of a blurred impression or other imperfections generated from network 14'.

The primary three-leg identification function is performed by burst counter 31 and decoder 32. Counter 31 generates outputs in binary coded decimal form depending on the number of group of signals received from converter 17. Decoder 32 is responsive to the outputs from burst counter 31 and has a single operative output line which generates an output signal only upon the incidence a signal indicative of three groups of signals.

The aforementioned rejection feature is performed by N-count multivibrator 33 and gating elements which comprise inverters 34 and 37, AND gate 35 and latch 36. In the present embodiment it is desired to reject a set in which any group contains more than five pulses. The cycle time of decision circuit 18 is sufficiently long to receive the 44 signals contained in converter 17 which stores the outputs of the periphery of network 14' and transmits the pulses in serial fashion along line 58 to logic circuit 18. Thus a CLOCK SET line is provided at latch 36 to reset circuit 18 after 44 cycles. Converter 15 must be designed to operate at a much faster rate than the remainder of the system. In the preferred embodiment, the system clock operates at a 1 MHz rate and converter 15 operates at a 44 MHz rate.

It is noted at this point that each of the circuits illustrated in block 18 is well known to those of skill in the art and commercially available. The operation of the reject circuitry is illustrated by way of example in FIG. 7. A set of three groups of signals is transmitted from converter 17 to decision circuit 18. The groups contain four, five and six pulses respectively. As previously mentioned, it is desired to ignore more than five pulses in any group; therefore N-count multivibrator 36 is set to N = 5. Upon the receipt of a first pulse in the first group, multivibrator 33 generates five pulses irrespective of the number of pulses in the group at node A. Inverter 34 inverts the signal from multivibrator 33 as shown at node B. Because node B is at a down, or logical 0 level, AND gate 35 generates a down level output at node C, thereby holding latch 36 to a negative level. The negative level of latch 36 is inverted at inverter 38 to a true or logical 1 level. Upon the receipt of an indication of three distinct groups from decoder 32, AND gate 38 is activated and generates a logical 1 signal on line 82 during the clock cycle.

As shown in FIG. 7 a similar action occurs for the second group which consists of five signals from converter 17. The third group of pulses, however, contains six pulses which is one more than the maximum allowed. In this event there is a coincidence of logical 1 signals at AND gate 35, thereby setting latch 36 to an up or logical 1 level. Inverter 37 inverts the signal to a down level or logical 0, causing the output from AND gate 38 to become a logical 0 during the 1 microsecond clock cycle. This causes the output on line 82 to AND gate 21 to be a logical 0 and results in the rejection of the false impression of a bifurcation.

A Decision at gate 21 is made only at the end of each 44 subcycles. Hence, the set of pulses from converter 17 would be rejected in toto.

Figure 8:
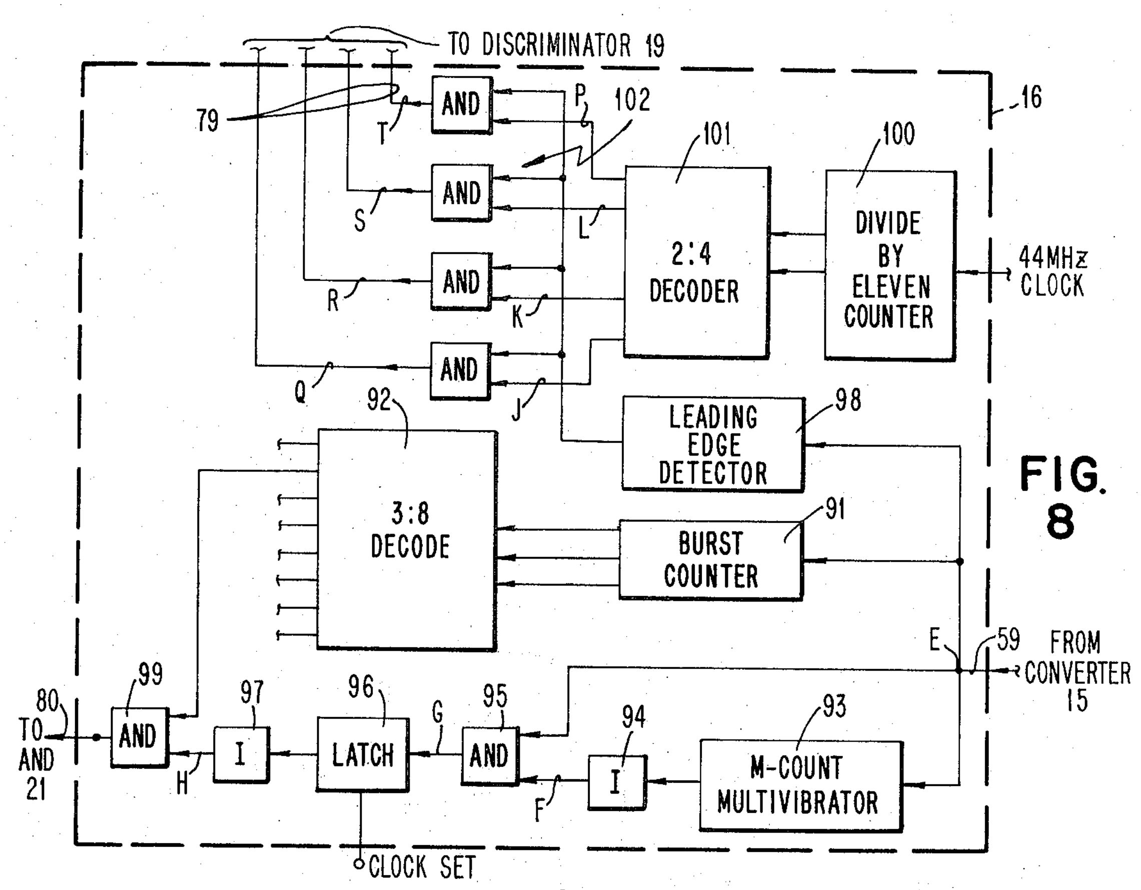
FIG. 8 is a detailed diagram of split decision logic block 16 illustrated in FIG. 1.
Figure 9:
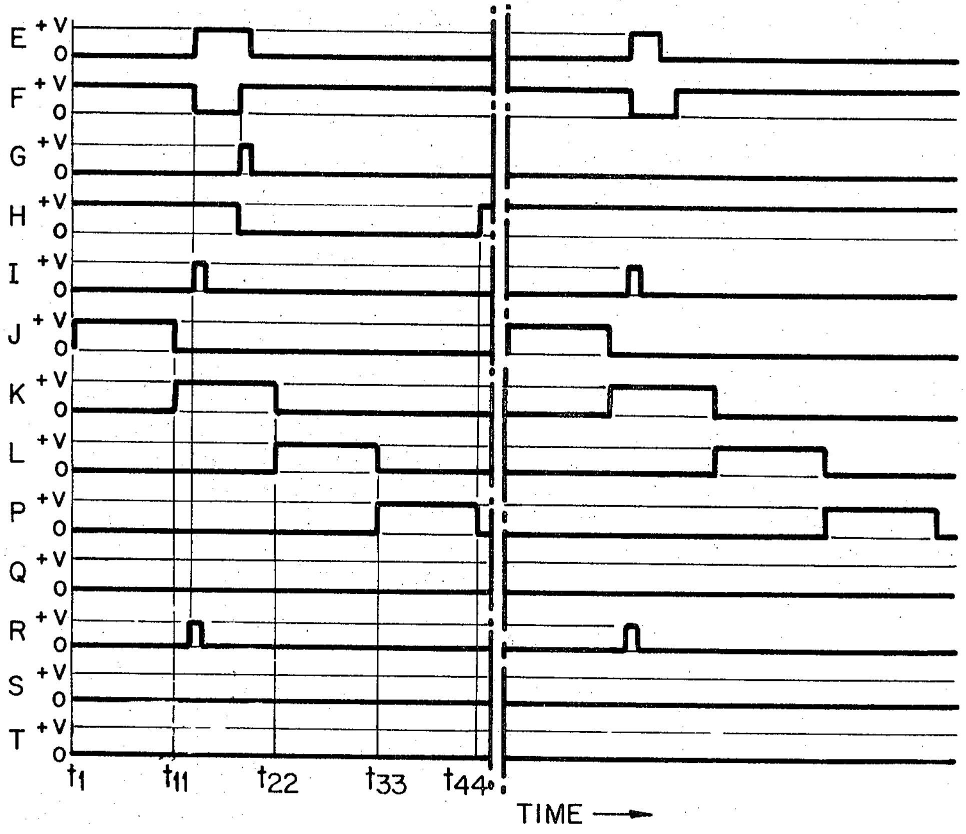
FIG. 9 is a timing diagram illustrating the timing relationship of pertinent signals within logic block 16.

Referring now to FIGS. 8 and 9, SPLIT decision logic circuit 16 is illustrated in conjunction with a timing diagram of wave forms generated within the circuit responsive to the outputs from continuity logic network 14. Network 14 generates one distinct group of logical 1 output signals in response to a split of a bifurcation superimposed thereon. The group of logical 1 signals is preceded and followed by logical 0 signals.

Circuit 16 performs three functions, two of which are quite similar to that of circuit 18 previously discussed. Circuit 16 functions as a means for generating an output at line 80 indicative of the identification of one, and only one, distinct groups of signals indicative of a split in a bifurcation. Secondly, circuit 16 operates to reject this group if it contains more than a predetermined number of logical 1 signals. Thirdly, the circuit functions to identify the particular quadrant of the periphery of matrix 14 from which the first signal in the group emanates.

The single leg identification function is performed by burst counter 91 and decoder 92. Counter 91 generates an output in binary coded decimal form indicative of the number of groups of signals received from converter 15. Decoder 92 is responsive to outputs from burst counter 91. It has a single operative output line which generates an output signal only upon the incidence of a signal indicative of one group of signals.

The rejection feature is performed by M-count multivibrator 93 and gating elements which comprise inverters 94 and 97, AND gate 95 and latch 96. In the present embodiment it is desired to reject a group of signals which contains more than five pulses. This number of signals is selected to be the same as the number in N-count multivibrator 33 of FIG. 6. The number is more or less arbitrary and could be greater or lower depending upon the particular system involved. The cycle time of decision circuit 16 is sufficiently long to receive the 44 signals contained in converter 15 which stores the outputs of the periphery of network 14 and transmits the pulses in serial fashion along line 59 to logic circuit 16. Thus, a CLOCK SET line is provided at latch 36 to reset circuit 16 after 44 cycles. As with the clock of logic circuit 18 the system clock operates at a 1 MHz rate and converter 15 operates at a 44 MHz rate.

The quadrant identification function is performed by detector 98, counter 100 and decoder 101. Simultaneous signals received from detector 98 and decoder 101 at one of the four AND gates denoted by numeral 102 generate a signal indicative of the quadrant in which the split is located on one of lines T, S, R or Q.

The operation of SPLIT decision circuit 16 is illustrated by way of example in FIG. 9. Nodes E, F, G and H correspond to nodes A, B, C and D of the circuit in FIG. 6 and their associated circuits function in the same fashion. Node 1 at the output of leading edge detector 98 generates a pulse in response to the first of the pulse group of logical 1 signals received from converter 15. Divide-by-11 counter 100 generates an output to decoder 101 after each 11 signals from the 44 MHz clock. Thus the output of decoder 101 at nodes J, K, L and P define a particular one of the four sides or quadrants of the periphery of network 14. The coincidence of a signal at node 1 and an output from decoder 101 gates one of the AND circuits 102 and thereby identifies the particular quadrant at which the split is located.

FIG. 9 illustrates two distinct cycles, each of which are 1 microsecond in length and each of which is divided into 44 subcycles controlled by the 44 MHz clock. In the first cycle a group of signals containing seven pulses is received from converter 15. As it is desired to ignore more than five pulses in any group, M-count multivibrator 93 is set to M=5. Upon the receipt of a first pulse in the group, multivibrator 93 generates five pulses, irrespective of the number of pulses in the group at node E. Inverter 94 inverts the signal from multivibrator 93 as shown at node F. Because the group of pulses contains seven pulses which is two more than the maximum allowed, there is a coincidence of logical 1 signals at AND gate 95, resulting in a positive pulse at node G. Latch 96 is set to a logical 1 level, which is inverted by inverter 37 to a logical 0. This causes the output from AND gate 99 to become a logical 0 during the 1 microsecond clock cycle. This causes the output on line 80 to AND gate 21 to be a logical 0, resulting in the rejection of the false impression of a split in a bifurcation.

During the operation of this first cycle an output pulse from leading edge detector 98 at node 1 coincides with the ¼ microsecond pulse (11 subcycles) at node K from decoder 101 to generate an output pulse at line R. This pulse is transmitted via cable 79 to coordinate discriminator 19, the operation of which will be described more fully in a later section of this specification.

FIG. 9 also illustrates a second 1 microsecond interval in which a pulse group of four pulses is received from converter 15 which results in the generation of a positive output on line 80 to AND gate 21 and a second pulse on line R to discriminator 19. A more detailed description of this cycle is considered to be unnecessary to those who have read the preceding sections of this specification.

Figure 10:
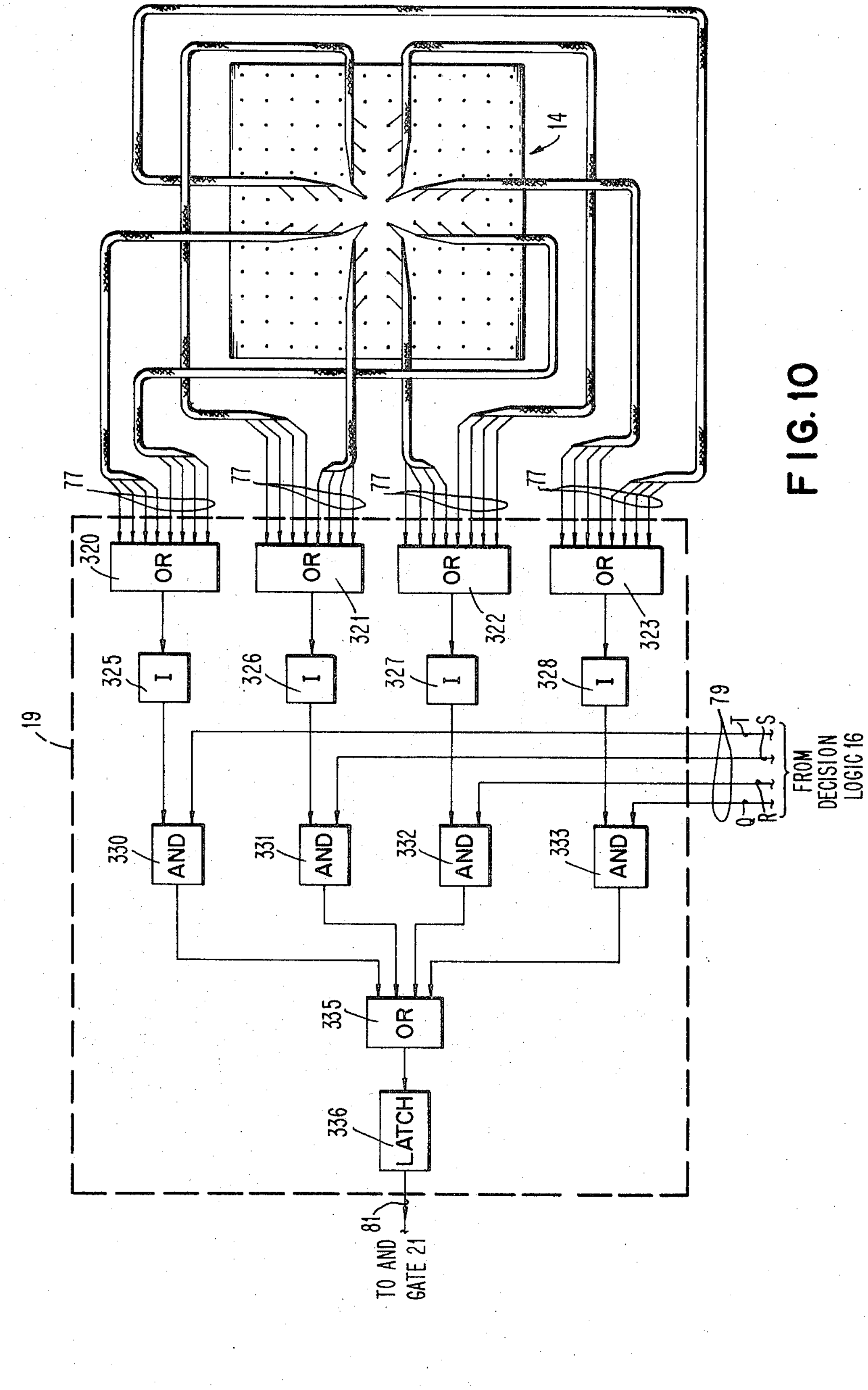
FIG. 10 is a detailed diagram of coordinate discriminator 19 illustrated in FIG. 1 and its connection to selected points in continuity logic network 14.

FIG. 10 shows the operative relationship between network 14 and discriminator 19. Discriminator 19 functions to insure that a particular bifurcation will be detected in the system only once. Without discriminator 19 the same bifurcation could generate more than one signal from AND gate 21. In general, the continuity logic network operates during each successive scanning interval to generate a signal if the requisites of a bifurcation are met, i.e. three individual paths between the source +V and the periphery of the matrix. It will often happen that the bifurcation will be detected during a number of different scanning intervals due to the nature of the bifurcation signal itself.

Referring specifically to FIG. 10, selected circuits of network 14 have outputs connected through cable 77 to OR gates which operate as inputs to discriminator 19. The outputs on cable 77 emanate from the AND gates of the circuits and are in addition to the outputs of the network previously described. These output lines form a cross pattern about the voltage source +V at the center of matrix 14 and, in conjunction with discriminator 19, function to block the recognition of a split in the bifurcation more than once.

The output pattern is divided into two separate columns and rows, each of which is connected to an individual one of OR gates 320–323. The outputs of the OR gates are connected to inverters 325–328, respectively. AND gates 330–333 function to gate a signal from its associated inverter when a quadrant detect signal is received from logic circuit 16 on cabling 79. An output signal from one of the AND gates is fed to latch 336 where it is held in the logical 1 position and terminated at AND gate 21 in combination with the signals from logic circuits 16 and 18.

Figure 11A:
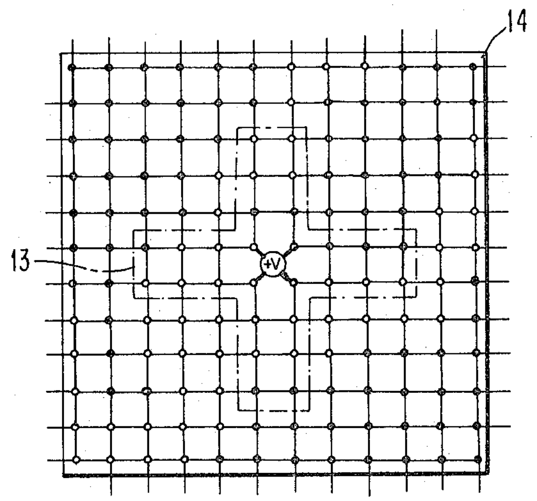
FIG. 11 illustrates the operation of coordinate discriminator 19.
Figure 11B:
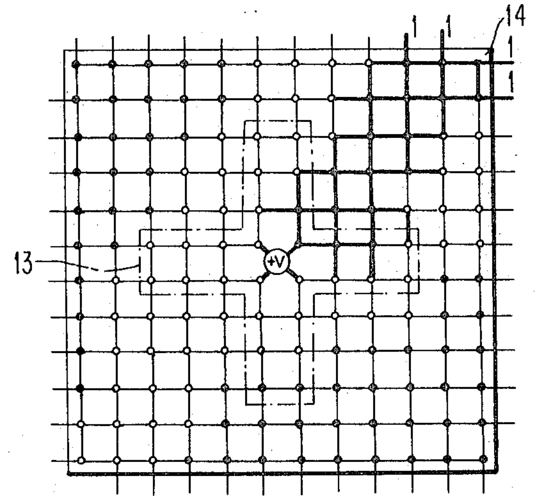
Figure 11C:
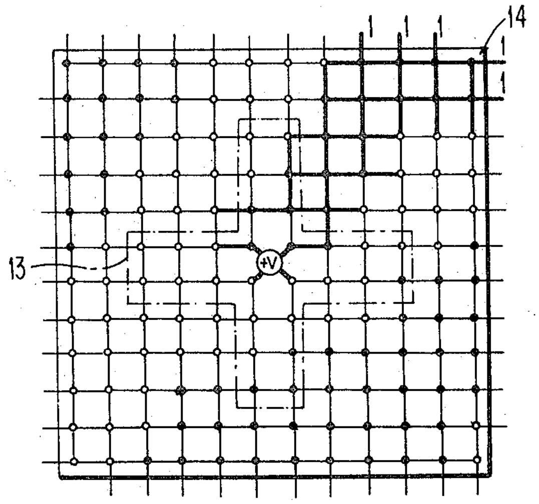

The operation of discriminator 19 can best be appreciated by referring to FIGS. 11*a*, 11*b* and 11*c*, in conjunction with FIG. 10.

The figures illustrate the appearance of a split in the bifurcation at succeeding scan intervals on a network 14. The cross pattern formed by the outputs to discriminator 19 is shown in dotted lines by numeral 13. It will be recalled at this point that the TV raster encompasses 350 dots and temporary memory 8 in FIG. 1 comprises 12 shift registers of 350 bits in length. Thus each scanning interval is 350 microseconds.

In FIG. 11*a* a split in a bifurcation appears at the upper right hand corner of network 14 as illustrated by the filled in dots. However, the split is not detected at this point because there is no connection between potential source +V at the center of network 14 to the inputs received from shift registers 9. For a split to be detected, at least one of the matrix points adjacent to source +V must be energized by a signal from its associated location in shift register 9.

In FIG. 11b the inputs from shift register 9 have been displaced one column to the left of the matrix; and the presence of the split is indicated by the logical 1 signals at the outputs on the upper right hand portion of network 14. Because the number of logical 1's in that group does not exceed five, the presence of the split will be indicated by an output from split decision logic circuits 16 along line 80 to AND gate 21 (FIG. 1). Logic circuit 16 also indicates to discriminator circuit 19 that the split is located in the upper portion of matrix 14 by gating AND gate 332 on line R of cable 79. Simultaneously OR gates 323 and 321 are activated because of the signals at their corresponding circuit locations in matrix 14. OR gates 320 and 322 are held at a 0 level because there is no signal at their column and row outputs. The positive signals at gates 321 and 323 are inverted by inverters 326 and 328 respectively to zero and the zero outputs from OR gates 320 and 322 are inverted to logical 1 signals. Because an indication of a shift has been received at AND gate 332 on line R the signal from inverter 327 is gated through AND gate 332 through OR gate 335 to actuate latch 336 to a logical 1 output. Thus, at this point AND gate 21 receives an indication of a bifurcation from discriminator 19 as well as from logic circuit 16.

In FIG. 11*c* during the succeeding scanning interval the same split is superimposed on network 14 as indicated by the logical 1 outputs at the upper right hand portion of the matrix. However, the pattern at outputs to coordinate discriminator 19 serves to block recognition of this split, because the output of OR gate 322 becomes a logical 1. This signal is inverted to a logical 0 in inverter 327 and prevents the operation of AND gate 332. The split signals are shifted one column position in FIG. 11*c* from that in FIG. 11*b*. Thus, OR gate 322, which in the previous scan was not activated, is now activated to generate a 1 output to inverter 327. Inverter 327 generates an 0 output to AND gate 332. Thus the signal on line R is not gated through gate 322 and the output from discriminator 19 is at a logical 0 level. This operation occurs irrespective of the quadrant on the matrix in which the split occurs due to the symmetry of pattern 13 and the circuits in discriminator 19.

In summary, we have invented a system which is capable of identifying the merger of lines. The specific embodiment described is for detecting bifurcations in fingerprints and is compatible with overall fingerprint identification or verification networks which involve central processing and storage units and data communication lines. The system features novel decision and recognition circuits. The basic building blocks of the circuits are constructed from commercially available components, many of which are presently available in integrated circuit for ease of fabrication, reliability and relatively low cost.

As previously noted, the system is also adaptable for recognizing ridge endings as well as bifurcations. Ridge endings appear to the system as the negative of a bifurcation. Therefore, in adapting the system for this purpose, it is necessary only that the binary signals be inverted before being processed, for example, between digitizer 5 and memory 8 in FIG. 1.

Although the invention has been described with a certain degree of particularlity, it is understood that the present disclosure has been made only by way of example and that numerous changes in the details of construction, the combination and arrangement of parts, may be made without departing from the spirit and the scope of the invention as hereinafter claimed.

For example, the coordinate discriminator pattern in FIG. 10 comprises two rows and two columns of eight logic elements each, for defining the four guadrants of the matrix. However, fewer elements could be used depending on the sensitivity required. In a 12 × 12 continuity logic network, we have found that the eight-element cross pattern affords best results. This pattern operates to suppress bifurcation indications in scanning intervals both preceding and succeeding the particular interval in which an output is generated from the discriminator to AND gate 21.

What is claimed is:

1. A system for recognizing minutiae in a fingerprint comprising:

means for sensing selected areas of said fingerprint and for generating binary signals representative of the contrast between ridges and valleys in said fingerprint;

continuity logic means including a matrix of logic elements operative in response to said binary signal for forming conductive paths corresponding to the contrast between ridges and valleys;

means connected to said continuity logic means in response to said conductive path for providing an indication of a minutiae; and discriminator means connected to said continuity logic means for insuring that a particular minutiae is identified only once.

2. A system as in claim 1 wherein said sensing means comprises:

scanning means for scanning said pattern; and means for converting the output of said scanning means into said binary signals.

3. A system as in claim 2 wherein said discriminator means is connected to the outputs of selected ones of said logic elements and is operative during each scanning interval for suppressing an indication of a minutiae sensed by said indication means during another scanning interval.

4. A system as in claim 3 further including:

a source of a continuity signal connected to the inputs of the four logic elements which comprise the center of said matrix; and wherein said selected ones of logic elements include said centrally located elements.

5. A system as in claim 4 further comprising:

means for identifying the quadrant location of a particular minutia in said matrix; and wherein said discriminator means comprises:

first gating means connected to said selected logic elements for transmitting a signal indicative of a conductive path during a scanning interval and for blocking said conductive path signal during other scanning intervals; and second gating means responsive to the coincidence of a signal from said quadrant identifying means and a conductive path signal from said first gating means for gating only one signal for each particular minutia.

6. A system for recognizing the merger of two lines in a pattern consisting of lines and spaces between lines comprising:

scanning means for scanning said pattern;

means for converting the output of said scanning means into binary signals representative of the contrast between said lines and said spaces;

continuity logic means including a matrix of logic elements operative in response to said binary signals for forming conductive paths corresponding to the contrast between said lines and spaces;

means connected to said continuity logic means and responsive to said conductive paths for providing an indication of a merger of two lines; and discriminator means connected to said continuity logic means for ensuring that a particular merger is identified only once.

7. A system as in claim 6 wherein said discriminator means is connected to the outputs of selected ones of said logic elements and is operative during each scanning interval for suppressing an indication of a merger sensed by said indication means during another scanning interval.

8. A system as in claim 7 further including:

a source of a continuity signal connected to the inputs of the four logic elements which comprise the center of said matrix; and wherein said selected ones of logic elements include said centrally located elements.

9. A system as in claim 8 further comprising:

means for identifying the quadrant location of a particular merger in said matrix; and wherein said discriminator means comprises: first gating means connected to said selected logic elements for transmitting a signal indicative of a conductive path during a scanning interval and for blocking said conductive path signal during other scanning intervals; and second gating means responsive to the coincidence of said quadrant identifying signal and a conductive path signal from said first gating means for gating only one signal for each particular merger.

10. A system for recognizing minutiae in a fingerprint comprising:

scanning means for scanning selected areas of said fingerprint and for generating binary signals representative of the contrast between ridges and valleys in said fingerprint;

continuity logic means including a matrix of logic elements operative in response to said binary signals for forming conductive paths corresponding to the contrast between ridges and valleys;

means responsive to said conductive paths for detecting the existence of three groups of binary signals representative of a minutia;

decoder means connected to said detecting means for providing an indication signal of said minutia;

means responsive to each said group of signals for generating an output of a predetermined number of signals irrespective of the number of signals in said groups; and gating means responsive to said generating means and said binary signal groups for gating an indication signal if the number of signals in each said group is less than said predetermined number.

11. A system as in claim 10 wherein said conductive paths terminate at the outputs of logic elements which comprise the periphery of the matrix, and further comprising:

converter means connected to said peripheral outputs for receiving said groups of signals in parallel and for transmitting said groups of signals serially to said detector means.

12. A system as in claim 11 further comprising:

means for inverting the polarity of said binary signals;

second continuity logic means including a second matrix of logic elements operative in response to said inverted binary signals for forming conductive paths corresponding to the contrast between ridges and valleys;

means connected to said second continuity logic means and responsive to said conductive paths for providing an indication of a split in a minutia;

second decoder means connected to said single group detecting means for providing an indication signal of said split;

means responsive to said single group of signals for generating an output of a predetermined number of signals irrespective of the number of signals in said group; and gating means for gating said indicating signal if the number of signals in said group is less than said predetermined number.

13. A system as in claim 11 wherein said conductive paths terminate at the outputs of the logic element which comprise the periphery of said second matrix, and further comprising:

second converter means connected to said peripheral outputs of said second matrix for receiving said single signal group and for transmitting said group serially to said detector.

14. A system for recognizing the merger of two lines in a pattern consisting of lines and spaces between lines comprising:

scanning means for scanning said pattern;

means for converting the output of said scanning means into binary signals representative of the contrast between said lines and said spaces;

continuity logic means including a matrix of logic elements operative in response to said binary signals for forming conductive paths corresponding to the contrast between said lines and spaces;

means responsive to said conductive paths for detecting the existence of three groups of binary signals representative of a merger of two lines;

decoder means connected to said detecting means for providing an indication signal of said merger;

means responsive to each said group of signals for generating an output of a predetermined number of signals irrespective of the number of signals in said group; and gating means responsive to said generating means and said binary signal groups for gating an indication signal if the number of signals in each said group is less than said predetermined number.

15. A system as in claim 14 wherein said conductive paths terminate at the outputs of the logic elements which comprise the periphery of the matrix, and further comprising:

converter means connected to said peripheral outputs for receiving said groups of signals in parallel and for transmitting said groups of signals serially to said detector means.

16. A system as in claim 14 further comprising:

means for inverting the polarity of said binary signals;

second continuity logic means including a second matrix of logic elements operative in response to said inverted binary signals for forming conductive paths corresponding to the contrast between said lines and spaces;

means responsive to said conductive paths for detecting the existence of a single group of binary signals representative of a split between two merged lines;

second decoder means connected to said single-group detecting means for providing an indication signal of said split;

means responsive to said single group of signals for generating an output of a predetermined number of signals irrespective of the number of signals in said group; and gating means for gating said indication signal if the number of signals in said group is less than said predetermined number.

17. A system as in claim 16 wherein said conductive paths teminate at the outputs of the logic elements which comprise the periphery of said second matrix, and further comprising:

second converter means connected to said peripheral outputs of said second matrix for receiving said signal group and for transmitting said group serially to said detector.

* * * * *